UNITED STATES PATENT OFFICE.

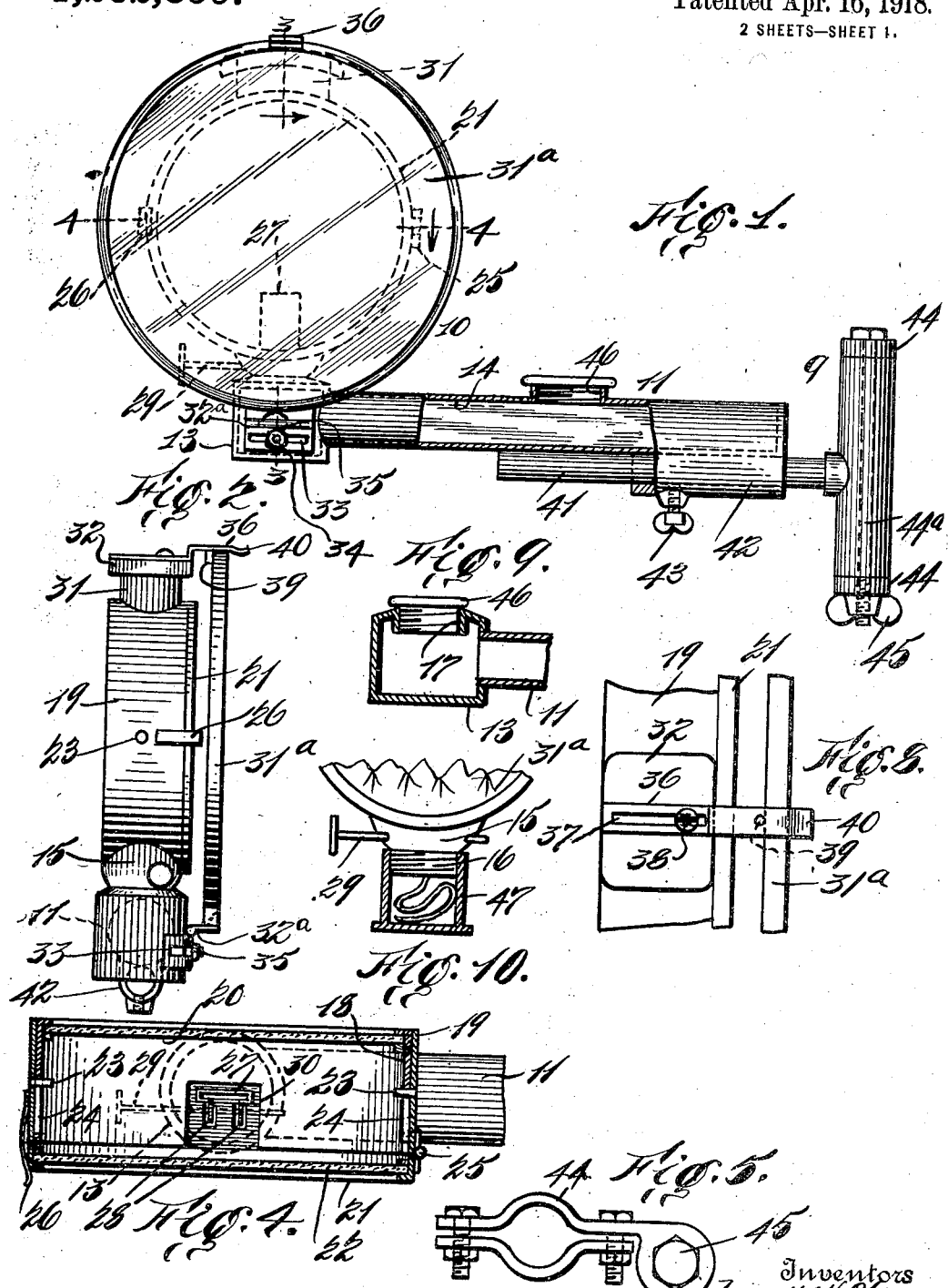

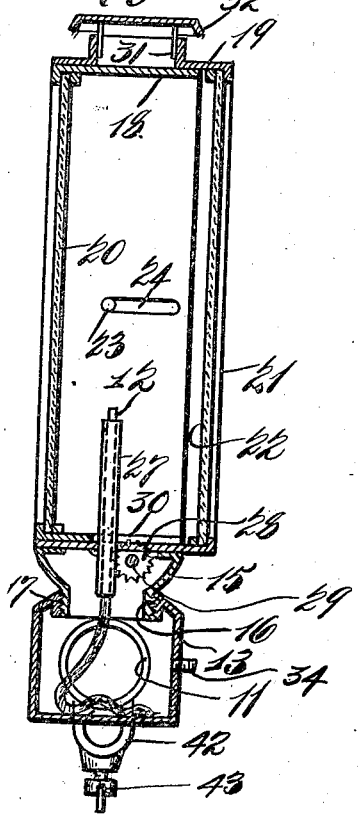
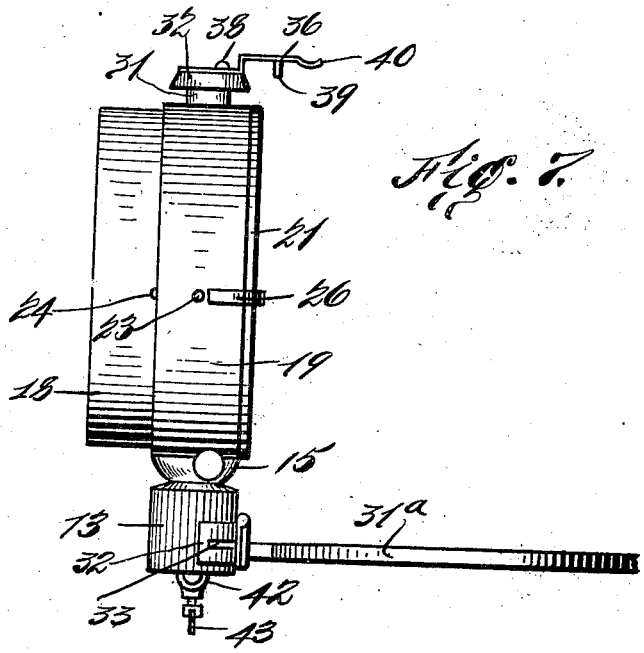
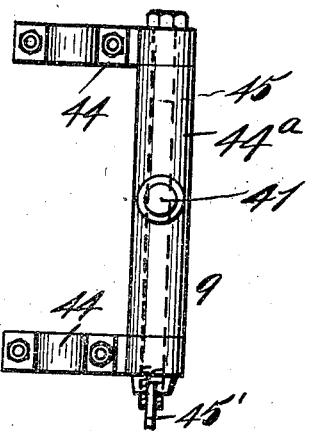

FRANK W. XIQUES, OF PORT RICHMOND, AND EDWARD A. JARVIS, OF WEST NEW BRIGHTON, NEW YORK.

LAMP.

1,262,899.  Specification of Letters Patent.  Patented Apr. 16, 1918.

Application filed March 21, 1917. Serial No. 156,279.

*To all whom it may concern:*

Be it known that we, FRANK W. XIQUES and EDWARD A. JARVIS, citizens of the United States of America, residing at Port Richmond, county of Richmond, State of New York, West New Brighton, county of Richmond, State of New York, respectively, have invented certain new and useful Improvements in Lamps, of which the following is a full, clear, and exact description.

This invention relates to an auxiliary lamp to be carried by motor vehicles for use in the event of failure of the electric lights to operate and also for use while the vehicle is parked at night in which event the electric lights can be extinguished. The chief object of our invention is to provide a light that can be attached to a vehicle and used in lieu of the electric lights thereby effecting a great saving of electrical current. Our lamp is preferably arranged to be attached to the wind shield structure of a vehicle and is foldable or collapsible into a comparatively small space. Therefore, it will not be an objectionable accessory. In combination with our foldable lamp we preferably employ a mirrorscope arranged to be moved out of line with the lamp when the lamp is to be used. The lamp can be attached to other parts of a vehicle if desirable, but the wind shield structure is the most convenient place for the lamp. The above is an outline of the object of our invention. A more detailed description will follow.

Figure 1 is rear elevation of the lamp assembly;

Fig. 2 is an end view thereof, the bracket being omitted.

Fig. 3 is an enlarged vertical sectional view of the lamp, the section being taken on a line 3—3 in Fig. 1.

Fig. 4 is an enlarged sectional plan view the section being taken on a line 4—4 in Fig. 1.

Fig. 5 is an enlarged top plan view of the bracket;

Fig. 6 is a front view of the bracket.

Fig. 7 is an end view of the lamp illustrated as extended for use.

Fig. 8 is an enlarged fragmentary plan view of the top of the lamp illustrating the adjustable latch for the mirrorscope.

Figs. 9 and 10 are detail views of caps to be employed to apply to the lamp body and reservoir when said lamp body and reservoir are separated.

As herein embodied our lamp assembly comprises a bracket 9, arranged for attachment to an upright of a wind shield (not shown) a lamp body 10 and an arm 11, which carries the lamp and which also is connected to the bracket 9. The arm 11 is tubular or hollow to form a reservoir for the liquid fuel for the wick 12 Fig. 3. The outer end of the arm 11 carries a well 13 to receive the wick 12, the well being in communication with the chamber 14 within the arm 11. In this instance, the lamp body 10 carries a thimble 15 threaded at 16 to engage the threaded opening 17 of the well 13. Other means to detachably connect the well and lamp body can be employed.

The lamp body consists of the telescoping members 18 and 19, which in this instance are cylindrical, the member 18 carrying a white semaphore 20. To the fixed lamp body member 19, we hinge a door 21 carrying a red semaphore 22. To prevent the withdrawal of the member 18 we have in this instance employed pins 23, carried by the lamp member 19 said pins passing through slots 24 in the member 18, the slots being long enough to permit the member 18 to be moved out when the lamp is to be used. As can be seen in Fig. 4, the door 21 is connected to the lamp member 19 by a hinge 25 permitting the door to be opened in order to light the lamp. A latch 26 serves to hold the door 21 closed.

The wick 12 is carried by the usual guide 27 which is secured to the lamp member 19 and through which it passes, the usual serrated feeding wheels 28 and shaft 29 to rotate same being employed to adjust the wick. As can be seen in Figs. 3 and 4, the lamp member 18 is cut away at 30 to permit said member to be slid inwardly or outwardly. The cut away portions of the said lamp member 18 straddle the wick guide 27.

The lamp member 19 carries a flue 31 and cowl 32, the flue being covered when the lamp is collapsed, but will be uncovered when the lamp is extended for use.

In combination with the lamp assembly, we preferably employ a mirrorscope 31ª carried by an adjustable hinge bracket 32ª. The hinge bracket 32ª is provided with a slot 33 through which a threaded stud carried by the well 13, passes, a nut 35 serving to hold the bracket in adjusted positions. The bracket is made movable in order that it can be adjusted to the right or left to suit the driver. As the well 13 is cylindrical, the mirrorscope will be adjusted in a circular path. To obtain angular adjustment in a vertical plane we provide an adjustable latch 36 provided with a slot 37 through which a binding screw 38 passes. The latch 36 carries a stop pin 39 for the mirrorscope to abut against. The outer end of the latch is turned down at 40 to serve as a keeper. To obtain angular adjustment of the mirrorscope the latch 36 will be adjusted inwardly or outwardly and held in an adjusted position by the binding screw 38.

In order that the lamp can be adjusted inwardly or outwardly, we provide the bracket 9 with an extension 41 engaging a socket 42 on the lamp arm or reservoir 11, the lamp being held in adjusted positions by a set screw 43. In order that the lamp can be radially adjusted, we provide the bracket 9 with clamps 44 between which is rotatably supported a post 44ª, said post carrying the projection or extension 41. A spindle 45 connects the clamps 44 and post 44ª. The lower end of the spindle is threaded and carries a wing nut 45' by which means the clamps and post can be firmly forced together and prevent any premature movement on the part of the lamp.

The clamps 44 serve to secure the lamp assembly to a wind-shield upright. The reservoir can be filled through a spout 46. We do not limit ourselves to any particular form of clamp, as various styles will have to be used to accommodate various types of supporting elements.

It will be apparent from the foregoing that the lamp 10 is rotatably connected to a vehicle and is also adapted for adjustment toward or away from the support to which it is clamped. When the lamp is to be used, the mirrorscope will be swung down as shown and the lamp-member 18 extended, as in Fig. 7, after which the wick can be ignited. If desirable the lamp can be removed from its bracket and packed away when not in use.

As the lamp is rotatably mounted for radial adjustment as well as slidably mounted on the extension 41, it can be adjusted to any desired position to suit the driver. Should it be desirable to separate the lamp body 10 from the arm or reservoir 11, a plug 46 (Fig. 9) will be screwed into the threaded opening 17 of the well 13 and a cap 47 (Fig. 10) screwed onto the thread 16 of the thimble 15. The caps 46 and 47 when applied will confine the fuel oil in the reservoir in one instance, and to the wick in the other instance. Hence the lamp can be taken from the arm and both packed away, even if filled with oil.

What we claim as our invention is:

1. In a lamp a fuel reservoir consisting of a tubular arm, a socket carried by the arm at one end thereof to receive a supporting element, the axis of the socket and arm being in parallelism; a casing at the other end of the arm, a wick carried by the casing extending into the arm, and a plurality of transparent semaphores of different colors carried by the casing.

2. In combination with a lamp having a transparent semaphore, a mirror adjustably secured adjacent the lamp and normally positioned in front of and in alinement with the semaphore, said mirror being arranged to be moved out of alinement with the semaphore when the lamp is in use and means arranged to automatically reset the mirror in the position from which it had been moved when said mirror is again returned to the position of alinement with the semaphore.

3. A lamp consisting of a plurality of collapsible sections, a burner passing through the wall of one of said sections, the other section being cut away to straddle said burner when said sections are collapsed, a wick carried by the burner, and means exterior of the casing to supply the wick with fuel.

4. The combination of a tubular arm, a lamp casing at one end of said arm, a wick carried by the casing extending into said arm, a socket carried by the arm and located at the opposite end thereof, a clamping screw carried by the socket, a clamp, and an extension carried by the clamp engaging said socket.

5. In combination with a lamp having a transparent semaphore, a bracket adjustably supported adjacent the lamp, a mirror pivoted to said bracket arranged for movement away from said semaphore, said mirror being normally positioned in front of said semaphore and in alinement therewith, and an adjustable latch for said mirror arranged to locate the mirror with respect to the lamp.

6. The combination of a tubular arm, a lamp casing at one end thereof, a wick carried by the casing extending into said arm, a clamp to engage a rounded support, and a binding element to releasably secure the arm and clamp together.

7. The combination of a tubular arm to retain a liquid fuel, a lamp casing at one end thereof, a wick carried thereby extending into said arm, a clamp, an extension carried thereby, means carried by the arm to slidably engage said extension, and means to bind the extension and arm firmly together.

8. The combination of a tubular arm to retain a liquid fuel, a lamp casing at one end thereof, a wick carried thereby extending into said arm, a clamp, a supporting member carried thereby, means carried by the arm to rotatably engage said supporting member, the axis of the tubular arm and supporting member being in parallelism, and means to bind the supporting member and the engaging means carried by the arm firmly together.

9. The combination of a support, a bracket adjustably secured to said support and extending at a right angle therefrom in a horizontal plane, arranged for adjustment about the vertical axis of the support, a mirror pivoted to said bracket arranged to be adjusted to a desired angular position toward or away from the support and an adjustable latch to maintain the mirror in an adjusted position.

10. The combination of a tubular arm to retain a liquid fuel, a lamp at one end of said arm, a support engaging socket carried by said arm, and a binding screw carried by the socket.

Signed at Port Richmond, N. Y. this 17 day of March 1917.

FRANK W. XIQUES.
EDWARD A. JARVIS.

Witnesses:
M. J. HUGHES,
ALBERT A. LUSTIG.